US012670371B2

(12) United States Patent
Zhang et al.

(10) Patent No.: US 12,670,371 B2
(45) Date of Patent: Jun. 30, 2026

(54) METHOD AND DEVICE FOR OPERATOR REGISTRATION PROCESSING BASED ON DEEP LEARNING AND ELECTRONIC DEVICE

(71) Applicant: BEIJING BAIDU NETCOM SCIENCE AND TECHNOLOGY CO., LTD., Beijing (CN)

(72) Inventors: Liujie Zhang, Beijing (CN); Xiang Lan, Beijing (CN); Tao Luo, Beijing (CN); Huihuang Zheng, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 1320 days.

(21) Appl. No.: 17/398,750

(22) Filed: Aug. 10, 2021

(65) Prior Publication Data

US 2021/0365767 A1      Nov. 25, 2021

(30) Foreign Application Priority Data

Sep. 29, 2020    (CN) .......................... 202011057647.X

(51) Int. Cl.
| | |
|---|---|
| *G06N 3/063* | (2023.01) |
| *G06F 9/30* | (2018.01) |
| *G06F 9/445* | (2018.01) |

(52) U.S. Cl.
CPC ........... *G06N 3/063* (2013.01); *G06F 9/3001* (2013.01); *G06F 9/44505* (2013.01)

(58) Field of Classification Search
CPC .......... G06N 3/063; G06N 3/045; G06N 3/04; G06N 3/08; G06F 9/3001; G06F 9/44505; G06F 9/5044
See application file for complete search history.

(56) References Cited

U.S. PATENT DOCUMENTS

| | | | |
|---|---|---|---|
| 9,323,907 B2 | 4/2016 | Tsuboi | |
| 2014/0094182 A1 | 4/2014 | Sato | |
| | (Continued) | | |

FOREIGN PATENT DOCUMENTS

| | | |
|---|---|---|
| CN | 107563360 | 1/2018 |
| CN | 107967135 | 4/2018 |
| | (Continued) | |

OTHER PUBLICATIONS

Japanese Office Action dated Nov. 29, 2022 as received in application No. 2021-150346.

(Continued)

*Primary Examiner* — Phenuel S Salomon

(74) *Attorney, Agent, or Firm* — Maschoff Brennan

(57) ABSTRACT

The disclosure provides a method and a device for operator registration processing based on deep learning, an electronic device, and a storage medium. Description information and logic operation information of a registered operator are obtained. An operator type of the registered operator is determined based on the logic operation information. Configuration information corresponding to the operator type and preset in a deep learning framework is obtained. It is detected whether the registered operator is registered completely based on the description information and the configuration information.

17 Claims, 7 Drawing Sheets

(56) References Cited

U.S. PATENT DOCUMENTS

| | | | | |
|---|---|---|---|---|
| 2018/0321918 | A1* | 11/2018 | Mcclory | H04L 41/5041 |
| 2019/0244097 | A1* | 8/2019 | Notsu | G06F 7/49942 |
| 2019/0303762 | A1* | 10/2019 | Sui | G06N 3/063 |
| 2019/0333199 | A1* | 10/2019 | Ozcan | G06N 3/047 |
| 2020/0117976 | A1* | 4/2020 | Liu | G06F 7/5443 |
| 2020/0133735 | A1* | 4/2020 | Zhao | G06N 20/00 |
| 2020/0210768 | A1 | 7/2020 | Turkelson et al. | |
| 2021/0224069 | A1* | 7/2021 | Chen | G06F 9/3001 |
| 2022/0076123 | A1* | 3/2022 | Li | G06N 3/0464 |
| 2023/0008597 | A1* | 1/2023 | You | G06F 18/29 |

FOREIGN PATENT DOCUMENTS

| | | | |
|---|---|---|---|
| CN | 108227932 | | 6/2018 |
| CN | 109064274 | | 12/2018 |
| CN | 110866610 | | 3/2020 |
| CN | 110929883 | | 3/2020 |
| CN | 111324345 | A | 6/2020 |
| CN | 111414646 | | 7/2020 |
| CN | 111428880 | | 7/2020 |
| CN | 111459290 | | 7/2020 |
| CN | 111488211 | | 8/2020 |
| JP | 2007265358 | A | 10/2007 |
| JP | 2009252019 | A | 10/2009 |
| JP | 2014157529 | A | 8/2014 |

OTHER PUBLICATIONS

Fu-Bi X et al., "The development of a depths study base whose offer is enabled" Nov. 29, 2022.

Office Action issued for corresponding EP application 21190719.1, dated Apr. 11, 2023.

James Ring, Kernel and Op Implementation and Registration API, Jun. 2, 2020, 7 pages, <https://github.com/tensorflow/community/blob/master/rfcs/20190814-kernel-and-op-registration.md>.

Understand Op Registration and Kernel Linking in Tensor Flow, retrieved Mar. 21, 2023, <https://stackoverflow.com/questions/37548662/understand-op-registration-and-kernel-linking-in-tensorflow>.

Create an op TensorFlow Core, retrieved Mar. 21, 2023, <https://web.archive.org/web/20200920221810/https://tensorflow.org/guide/create_op>.

OA for CN application 202011057647.X, Jul. 7, 2022.

Goldstein et al. "PipeRench: A Reconfigurable Architecture and Compiler" Apr. 2000.

Deng et al. "Database design of information quality inspection system", Sep. 2017.

Huhu "Three Logical Problems and Teaching Strategies of Deep Learning the Law of Conservation of Mechanical Energy" Jun. 2019.

Search Report for EP application 21190719.1, Feb. 1, 2022.

Aggarwal, "Neural Networks and Deep Learning : A Textbook" Sep. 2018.

Notice of Allowance for CN application 202011057647.X, Feb. 16, 2022.

* cited by examiner

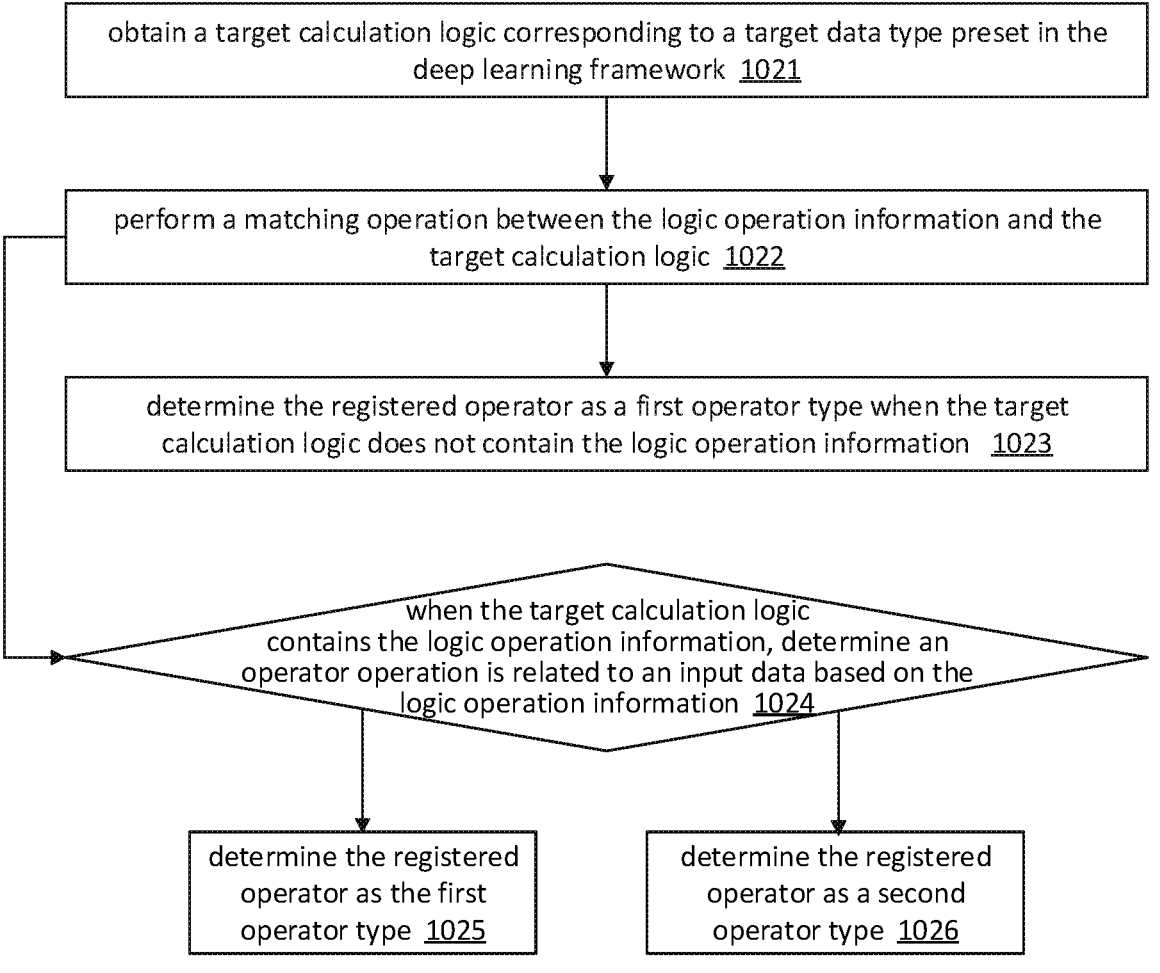

obtain a target calculation logic corresponding to a target data type preset in the deep learning framework  1021 perform a matching operation between the logic operation information and the target calculation logic  1022 determine the registered operator as a first operator type when the target calculation logic does not contain the logic operation information   1023 when the target calculation logic contains the logic operation information, determine an operator operation is related to an input data based on the logic operation information  1024 determine the registered operator as the first operator type  1025 determine the registered operator as a second operator type  1026

FIG. 2

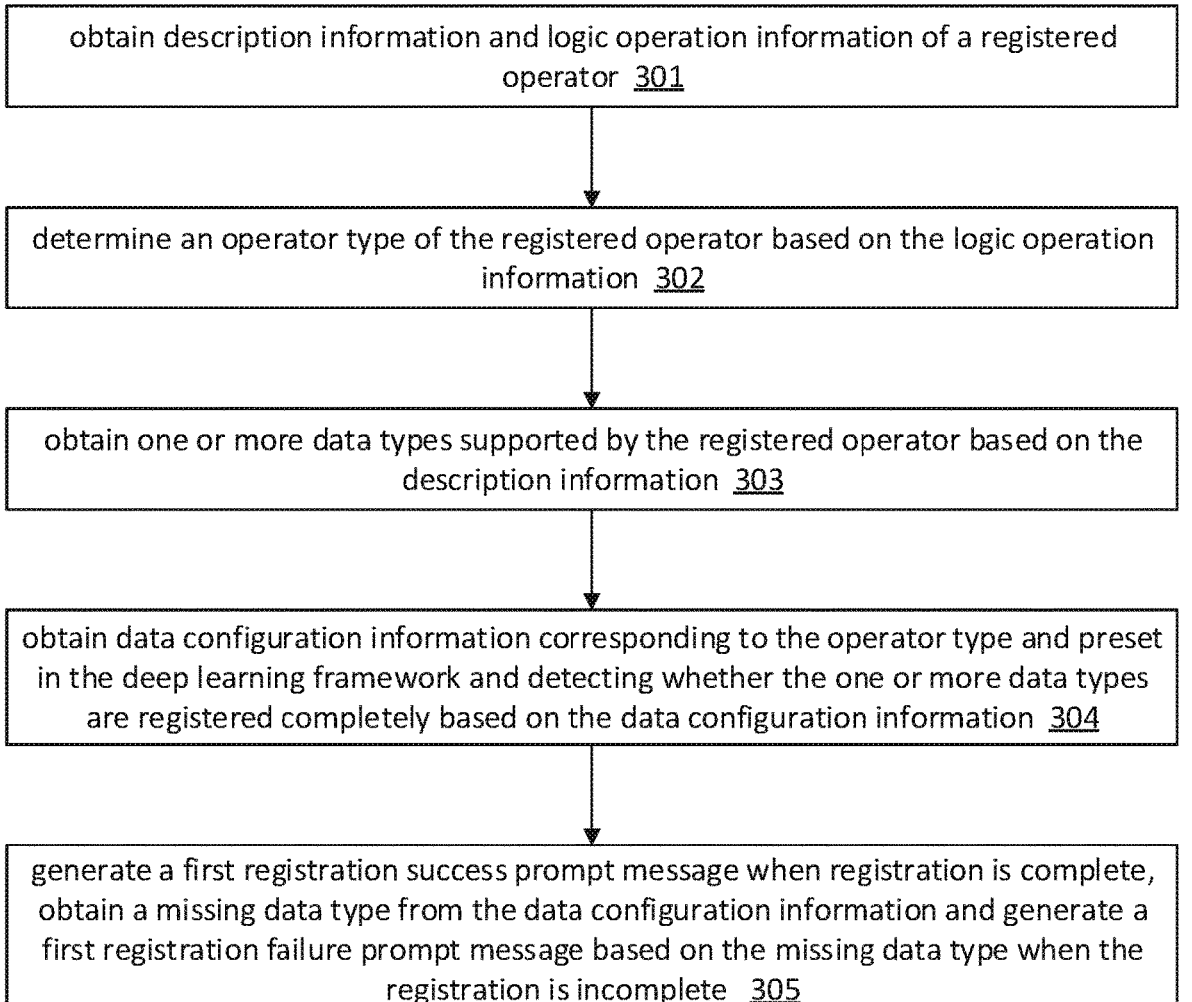

obtain description information and logic operation information of a registered operator 301 determine an operator type of the registered operator based on the logic operation information 302 obtain one or more data types supported by the registered operator based on the description information 303 obtain data configuration information corresponding to the operator type and preset in the deep learning framework and detecting whether the one or more data types are registered completely based on the data configuration information 304 generate a first registration success prompt message when registration is complete, obtain a missing data type from the data configuration information and generate a first registration failure prompt message based on the missing data type when the registration is incomplete 305

FIG. 3

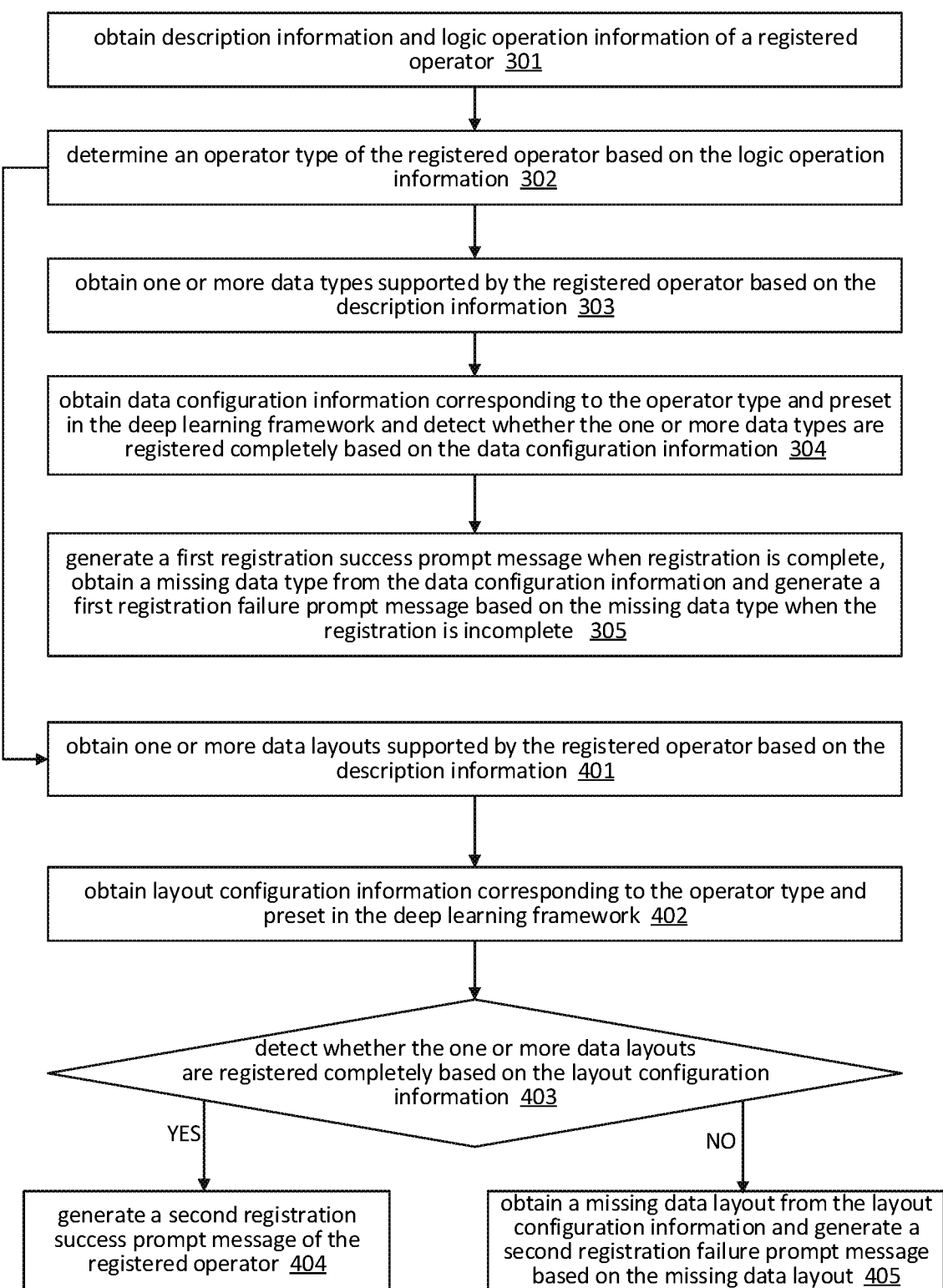

obtain description information and logic operation information of a registered operator 301 determine an operator type of the registered operator based on the logic operation information 302 obtain one or more data types supported by the registered operator based on the description information 303 obtain data configuration information corresponding to the operator type and preset in the deep learning framework and detect whether the one or more data types are registered completely based on the data configuration information 304 generate a first registration success prompt message when registration is complete, obtain a missing data type from the data configuration information and generate a first registration failure prompt message based on the missing data type when the registration is incomplete 305 obtain one or more data layouts supported by the registered operator based on the description information 401 obtain layout configuration information corresponding to the operator type and preset in the deep learning framework 402 detect whether the one or more data layouts are registered completely based on the layout configuration information 403

YES

NO generate a second registration success prompt message of the registered operator 404 obtain a missing data layout from the layout configuration information and generate a second registration failure prompt message based on the missing data layout 405

FIG. 4

METHOD AND DEVICE FOR OPERATOR REGISTRATION PROCESSING BASED ON DEEP LEARNING AND ELECTRONIC DEVICE

CROSS REFERENCE TO RELATED APPLICATIONS

This application claims priority and benefits to Chinese Application No. 202011057647.X, filed on Sep. 29, 2020, the entire content of which is incorporated herein by reference.

TECHNICAL FIELD

The disclosure relates to a field of deep learning technologies and computer vision technologies, and in particular to a method and a device for operator registration processing based on deep learning, an electronic device and a storage medium.

BACKGROUND

A deep learning framework usually contains various basic logic units of tensor calculation. Through a certain mechanism, a specific calculation logic can be registered as an operator, such as an addition operator or a convolution operator. Support degrees of operators in different deep learning frameworks are different in terms of data types, data layouts, and operating devices, depending closely on specific implementations.

SUMMARY

A method for operator registration processing based on deep learning includes: obtaining description information and logic operation information of a registered operator; determining an operator type of the registered operator based on the logic operation information; and obtaining configuration information corresponding to the operator type and preset in a deep learning framework, and detecting whether registration of the registered operator is complete based on the description information and the configuration information.

An electronic device includes: at least one processor; and a memory communicatively coupled with the at least one processor, in which the memory has instructions executable by the at least one processor stored thereon, the instructions are executed by the at least one processor to cause the at least one processor to execute a method for operator registration processing based on deep learning as described above.

A non-transitory computer readable storage medium has computer instructions stored thereon. The computer instructions are configured to cause a computer to execute a method for operator registration processing based on deep learning as described above.

It should be understood, this part is not intended to recognize key or important features of embodiments of the disclosure, nor to limit the scope of the disclosure. Other features of the disclosure will be easily understood by the following description.

BRIEF DESCRIPTION OF THE DRAWINGS

The drawings are used to well understand the technical solution, and do not constitute a limitation to the disclosure.

FIG. 2 is a flowchart illustrating a method for operator registration processing based on deep learning according to some embodiments of the disclosure.

FIG. 3 is a flowchart illustrating a method for operator registration processing based on deep learning according to some embodiments of the disclosure.

FIG. 4 is a flowchart illustrating a method for operator registration processing based on deep learning according to some embodiments of the disclosure.

DETAILED DESCRIPTION

Figure 1:
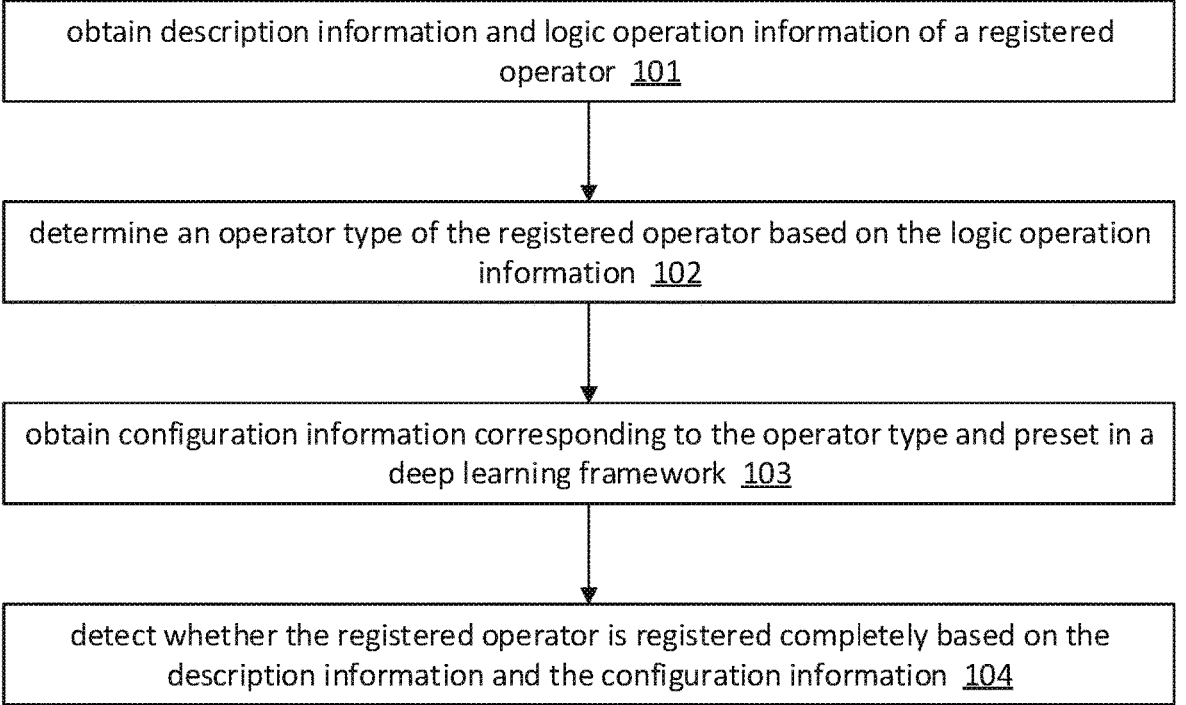
FIG. 1 is a flowchart illustrating a method for operator registration processing based on deep learning according to some embodiments of the disclosure.

Example embodiments of the disclosure will be described with reference to accompanying drawings, including various details of embodiments of the disclosure to facilitate understanding, which should be regarded as merely exemplary. Therefore, those of ordinary skill in the art should realize that various changes and modifications can be made to embodiments described herein without departing from the scope and spirit of the disclosure. Likewise, for clarity and conciseness, descriptions of well-known functions and structures are omitted in the following description.

It is be noted that the deep learning framework usually contains various basic logic units of tensor calculation. Through a certain mechanism, a specific calculation logic can be registered as an operator, such as an addition operator or a convolution operator.

Since functional requirements and usage scenarios of operators are different, types supported by different operators are different. Operators can support tensors of different data types, such as int8 (representing 8-bit signed integer) type, int32 (representing 32-bit signed integer) type, int64 (representing 64-bit signed integer) type, float (representing floating) type, float32 (representing 32-bit floating) type, double (representing double-precision floating) type, bool (representing Boolean variable) type and other types. Operators can also support tensors with different data layouts. For example, in a field of computer vision, an input tensor can be a four-dimensional tensor in a form of either [NCHW] of [NHWC], where N is the number of pictures, C is the number of channels, H is the height of the picture, and W is the width of the picture. In addition, each operator also supports calculations performed on different hardware devices, such as CPU (central processing unit) or GPU (graphics processing unit).

Different operators in the deep learning framework have different support degrees in terms of data types, data layouts, and execution devices, depending closely on implementations. Completeness of operator registration types is essential to the ease of use and core competitiveness of the framework. In related arts, the registration completeness of an operator in the deep learning frameworks mostly relies on the consciousness of framework developers, lacking systematic detection and monitoring method and easily causing an operator only support certain data types or data layouts.

In order to solve the problems that the registration completeness of the operator in the deep learning framework in related arts depends on the consciousness of the framework developer, lacking systematic detection and monitoring methods and causing insufficient support degree for the operator, the disclosure provides a method and a device for operator registration processing based on deep learning, an electronic device, and a storage medium. The disclosure can automatically detect and monitor whether each new operator in the deep learning framework is completely registered in terms of data type, data layout, and execution device. The labor costs can be reduced and research and development efficiency can be improved.

FIG. 1 is a flowchart illustrating a method for operator registration processing based on deep learning according to some embodiments of the disclosure. It is to be noted that the method for operator registration processing based on deep learning according to embodiments of the disclosure can be applied to a device for operator registration processing based on deep learning according to embodiments of the disclosure. The device for operator registration processing can be integrated into an electronic device.

As illustrated in FIG. 1, the method for operator registration processing based on deep learning may include the following.

At 101, description information and logic operation information of a registered operator are obtained.

The registered operator refers to an operator that had been registered.

It is to be noted that, in the deep learning framework, each operator usually includes at least two main parts, i.e., the description information and the logic operation information. The description information is used to define inputs and outputs of an operator, as well as information supported by the operator, such as data type, data layout, and execution device. The logic operation information is configured for tensor calculation logics. Tensor is a multi-linear function that can be used to express linear relationships between some vectors, scalars, and other tensors.

It is to be noted that operators supporting certain data types, data layouts, and execution devices can be added to the deep learning framework through a registration mechanism for C++ or Python to call. Each operator can be registered multiple times to support different data types.

In some examples, a list of all registered operators can be obtained from the deep learning framework. The registered operators in the list can be traversed to obtain the description information and logic operation information of each registered operator.

At 102, an operator type of the registered operator is determined based on the logic operation information.

In some examples, the operator type may be classified as at least a first operator type or a second operator type. The first operator type refers to general type, and the second operator type refers to other types (i.e., non-general type). A general-typed operator can be understood as that the operator calculation logic does not strongly depend on specific data types, and operations related to the operator have nothing to do with a data area of an input tensor. An other-typed operator can be understood as a non-general-typed operator. That is, the operator calculation logic depends on specific data types, and operations related to the operator are related to a data area of an input tensor.

As an example, operators in the deep learning framework can be functionally divided into general-typed operators and other-typed operators. The general-typed operators can include arithmetic operation type, such as commonly-used finding absolute value, exponential calculation, trigonometric function, activation function, Reduce (array method), or index operation operator, such as finding minimum value, mean operation, sorting operation. Other-typed operators can include operators related to tensor transformation, such as reshape (a function that can change the array structure), and value assignment.

It is to be understood that due to the operator type, different types of operators have different registration completeness requirements. Therefore, before performing registration completeness detection, the operator type to which the registered operator belongs can be determined. Since the logic operation information of the operator is used for the tensor calculation logic, it may be determined whether the registered operator is the general type or other type based on the logic operation information of the operator.

In some examples, as illustrated in FIG. 2, 102 may include the following.

At 1021, a target calculation logic corresponding to a preset target data type is obtained in the deep learning framework.

In an example, some unusual and certain data types with strong calculation logics can be added to a whitelist. In addition to the certain data types with the strong calculation logics, the whitelist also includes target calculation logics corresponding to the certain data types. In addition, the target data type and the corresponding target calculation logic can be obtained from the pre-established whitelist.

At 1022, a matching operation is performed between the logic operation information and the target calculation logic.

At 1023, if the target calculation logic does not contain the logic operation information, it is determined that the registered operator is the first operator type.

That is, it is determined that the calculation logic of a registered operator does not strongly depend on certain data types based on the logic operation information of the registered operator. In other words, when the arithmetic operation of the registered operator is a general-typed arithmetic operation, it can be determined that the registered operator is the first operator type, i.e., the registered operator is a general-typed operator.

At 1024, if the target calculation logic contains the logic operation information, it is determined whether an operator operation of the registered operator is related to an input data based on the logic operation information.

That is, when it is determined that the calculation logic of the registered operator strongly depends on certain data types based on the logic operation information of the registered operator, it can be determined whether the operator operation of the registered operator is related to the input data based on the logic operation information, i.e., it is determined whether the operator operation is related to a data area of an input tensor.

At 1025, if the operator operation is not related to the input data, it is determined that the registered operator is the first operator type.

That is, when it is determined that the operation related to the operator is not related to the data area of the input tensor, it can be determined that the registered operator is the first operator type, i.e., the registered operator is a general-typed operator.

At 1026, if the operator operation is related to the input data, it is determined that the registered operator is the second operator type.

That is, when it is determined that the operation related to the operator is related to the data area of the input tensor, i.e., the calculation logic of the registered operator strongly depends on certain data types and the operation related to the operator is related to the input tensor, the registered operator is the second operator type, i.e., the registered operator is an other-typed operator.

It can be seen that by determining whether the calculation logic of the operator strongly depends on certain data types and whether the operation related to the operator is related to the data area of the input tensor based on the logic operation information of the operator, it is determined whether the operator is the general-typed operator or the other-typed operator. Therefore, a corresponding registration completeness detection rule can be adopted based on the operator type to implement the registration completeness detection on the operator.

At 103, configuration information corresponding to the operator type and preset in the deep learning framework is obtained.

That is, due to different operator types, different configuration information can be used to detect whether the operator is completely registered. Therefore, for detecting the registration completeness of the registered operator, the configuration information corresponding to the operator type of the registered operator in the deep learning framework can be obtained, and the configuration information can be used to implement the registration completeness detection on the registered operator.

At 104, it is detected whether registration of the registered operator is complete based on the description information and the configuration information.

In some examples, first key information in the description information is extracted, and second key information in the configuration information is extracted. It is determined whether the meaning of the first key information is the same as the meaning of the second key information. If the meaning of the first key information is the same as the meaning of the second key information, it is determined that the registered operator is completely registered. If the meaning of the first key information is different from the meaning of the second key information, it can be determined that the registered operator is incompletely registered.

When it is detected that the registered operator is completely registered, a registration success prompt message of the registered operator can be generated. The prompt message can be provided to the user such that the user can know that the registration of a newly added operator is complete based on the prompt message. When it is detected that the registration of the registered operator is incomplete, missing information can be obtained from the configuration information, and a corresponding registration failure prompt message is generated based on the missing information. The prompt message is provided to the user such that the user can know the reason why the registration of the registered operator is incomplete based on the prompt message.

With the method for operator registration processing based on deep learning according to embodiments of the disclosure, problems that the registration completeness of an operator in the deep learning framework in related arts mostly relies on the consciousness of framework develops, lacking systematic detection and monitoring methods and easily causing insufficient support degree for the operator can be solved. By obtaining the description information and the logic operation information of the registered operator, the registration completeness of a newly added operator in the deep learning framework can be automatically detected and monitored based on the description information and the logic operation information, which reduces labor costs and improves research and development efficiency. In addition, by systematically detecting and monitoring the registration completeness of the registered operator in various aspects (such as data type, data layout and execution device), the support degree of each newly added operator in various aspects may be ensured.

It is to be noted that different operators in the deep learning framework have different support degrees in terms of data type, data layout, and execution device, depending closely on implementations. In the disclosure, the registration completeness detection of a registered operator can be performed from the support degrees in terms of the data type, the data layout, and the execution device. Whether the data types supported by the operator are complete is a necessary condition for the registration completeness detection on the operator. For identifying whether the operator is completely registered based on the support degree in terms of the data types, data configuration information corresponding to the operator type can be obtained, and it is detected whether the data types supported by the registered operator are completely registered based on the data configuration information. In detail, as illustrated in FIG. 3, the method for operator registration processing based on deep learning may include the following.

At 301, the description information and logic operation information of the registered operator are obtained.

At 302, the operator type of the registered operator is determined based on the logic operation information.

At 303, one or more data types supported by the registered operator are determined based on the description information.

In some examples, reference data type information can be obtained, and the one or more data types supported by registered operator can be obtained by parsing the description information through a regular matching algorithm based on the reference data type information.

It is to be understood that the description information defines input and output of an operator, as well as information supported by the operator, such as the data type, the data layout, and the execution device. Therefore, in the disclosure, all the data types supported by the registered operator can be parsed sequentially through the regular matching algorithm.

At 304, data configuration information corresponding to the operator type and preset in the deep learning framework is obtained, and it is detected whether the one or more data types are completely registered based on the data configuration information.

In other words, due to different operator types, different data configuration information can be used to detect whether the one or more data types supported by the operator are complete. Therefore, in performing the registration completeness detection on the data types supported by the registered operator, the data configuration information corresponding to the operator type of the registered operator in the deep learning framework can be obtained. The data configuration information can be used to detect whether the one or more data types supported by the registered operator are registered completely.

As an example, a general-typed operator supports at least four data types, i.e., int32 type, int64 type, float type and double type. That is, after obtaining the data configuration information corresponding to the general-typed operator, it can be detected whether the data types supported by the registered operator at least contain the four data types, i.e., the int32 type, the int64 type, the float type and the double type based on the data configuration information. If the data types supported by the registered operator at least contain the four data types, it can be determined that the data types supported by the registered operator are registered completely. If the data types supported by the registered operator do not contain one or more of the int32 type, the int64 type, the float type and the double type, it can be determined that the data types supported by the registered operator are registered incompletely.

As another example, a non-general-typed operator at least supports both the int32 type and the int64 type, or both the float type and the double type. That is, after obtaining the data configuration information corresponding to the non-general-typed operator, it can be detected based on the data configuration information whether the data types supported by the registered operator includes both the int32 type and the int64 type, or both the float type and the double type. If the data types supported by the registered operator include both the int32 type and the int64 type, or both the float type and the double type, it can be determined that the data types supported by the registered operator are registered completely. If the data types supported by the registered operator only contain one of the int32 type and the int64 type, or one of the float type and the double type, it can be determined that the data types supported by the registered operator are registered incompletely.

At 305, if the registration is complete, a first registration success prompt message of the registered operation is generated. If the registration is incomplete, a missing data type is obtained from the data configuration information, and a first registration failure prompt message is generated based on the missing data type.

In other words, when it is detected that the data types supported by the registered operator are completely registered, the first registration success prompt message can be generated for the registered operator. The first registration success prompt message can be provided to the user, such that the user can understand that the registration of the data types supported by the registered operator is complete based on the prompt message. When it is detected that the data types supported by the registered operator are registered incompletely, the missing data type of the registered operator can be determined from the data configuration information corresponding to the operator type based on the detection result, and a corresponding registration failure prompt message is generated for the missing data type. The registration failure prompt message is provided to the user, such that that the user can understand the reason why the registration of the registered operator is incomplete based on the registration failure prompt message.

With the method for operator registration processing based on deep learning according to embodiments of the disclosure, the description information and the logic operation information of the registered operator are obtained, the operator type of the registered operator is determined based on the logic operation information the data types supported by the registered operator are obtained based on the description information, the data configuration information corresponding to the operator type and preset in a deep learning framework is obtained, and it is detected whether the data types are registered completely based on the data configuration information. If the registration is complete, the first registration success prompt message of the registration operator is generated. If the registration is incomplete, the missing data type is obtained from the data configuration information, and the first registration failure prompt message is generated based on the missing data type. It can be seen that the disclosure provides a method for systematically detecting and monitoring the registration completeness of an operator in the deep learning framework. By extracting the description information and logic operation information of the registered operator, it can be automatically detected and monitored whether each new operator in the deep learning framework is registered completely in terms of the data type based on the description information and the logic operation information. Labor costs can be reduced and research and development efficiency is improved. In addition, the registration completeness of the registered operator is systematically detected in terms of the data type, thereby the support degree of each new operator in terms of the data type is ensured.

It is to be noted that the registration completeness of an operator can also be reflected in terms of the data layout. That is, when it is detected whether the operator is completely registered in terms of the data type, the registration completeness is also detected in terms of the data layout. The accuracy of operator registration can be improved and automatic detection of registration completeness is specific and standardized. In detail, as illustrated in FIG. 4, the method for operator registration processing based on deep learning may further include the following on the basis of FIG. 3.

At 401, one or more data layouts supported by the registered operator are obtained based on the description information.

It can be understood that the description information defines inputs and outputs of an operator, as well as information supported by the operator, such as the data type, data layout, and execution device. Therefore, in the disclosure, the one or more data layouts supported by the registered operator can be obtained from the description information. It is to be noted that, an operator can support tensors with different data layouts. For example, in the field of computer vision, an input tensor can be a four-dimensional tensor in a form of [NCHW] or [NHWC], where N is the number of pictures, C is the number of channels, H is the height of the picture, and W is the width of the picture.

Therefore, for detecting the registration completeness of an operator, it is also detected whether the operator is completely registered in terms of the data layouts.

At 402, layout configuration information corresponding to the operator type and preset in the deep learning framework is obtained.

In other words, due to different operator types, it can be detected whether the one or more data layout supported by an operator are complete based on different layout configuration information. Therefore, for performing the registration completeness detection in terms of the one or more data layouts supported by the registered operator, the layout configuration information corresponding to the operator type of the registered operator in the deep learning framework can be obtained. It can be detected whether the one or more data layouts supported by the registered operator are completely registered based on the layout configuration information.

At 403, it is detected whether the one or more data layouts are completely registered based on the layout configuration information.

At 404, if registration is complete, a second registration success prompt message of the registered operator is generated.

At 405, if the registration is incomplete, a missing data layout is obtained from the layout configuration information, and a second registration failure prompt message is generated based on the missing data layout.

With the method for operator registration processing method based on deep learning according to embodiments of the disclosure, when detecting whether the operator is completely registered in terms of the data type, it is also checked whether the operator is completely registered in terms of the data layout. Therefore, the accuracy of operator registration completeness is improved and the automatic detection of operator registration completeness is specific and standardized.

Figure 5:
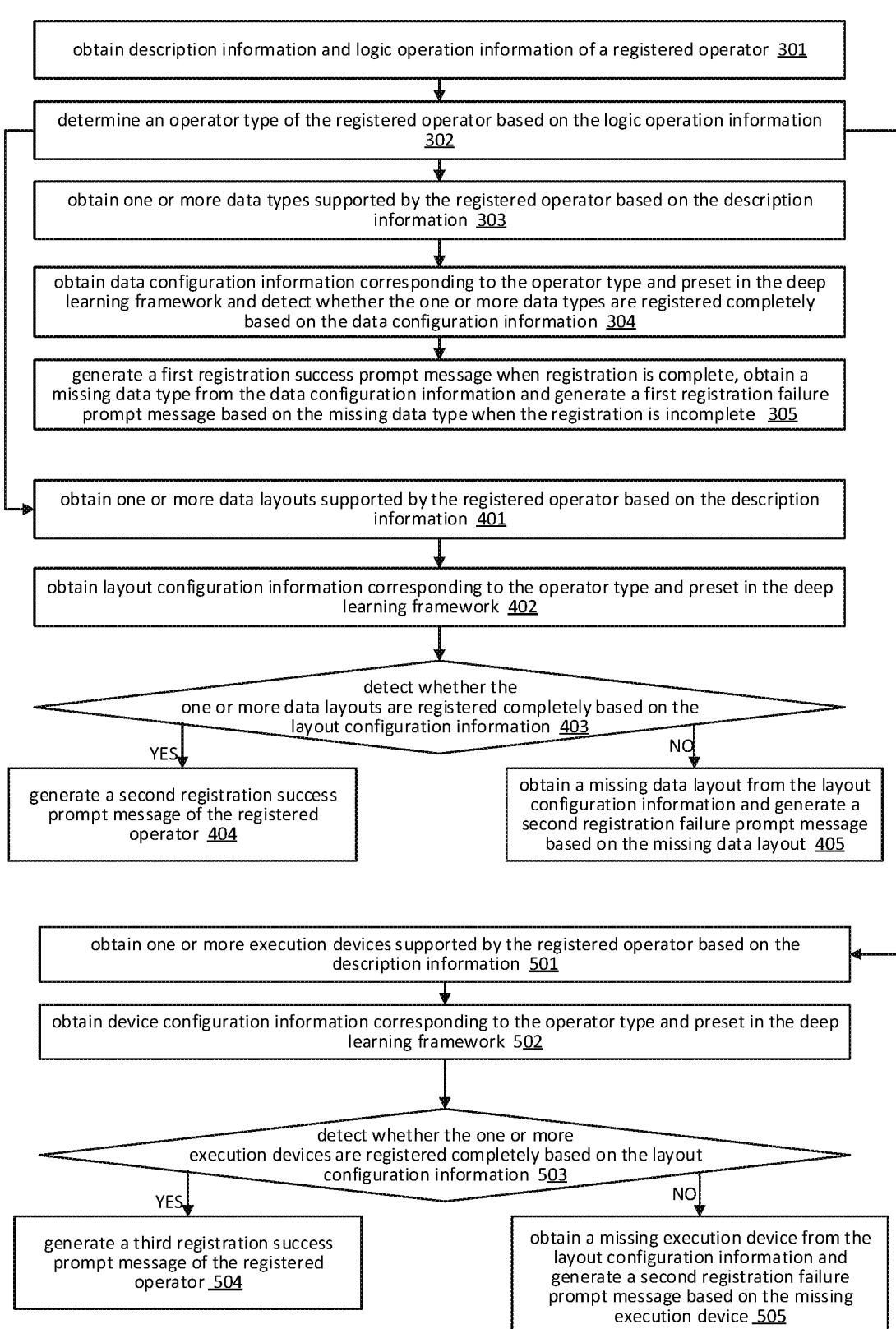
FIG. 5 is a flowchart illustrating a method for operator registration processing based on deep learning according to some embodiments of the disclosure.

It is to be noted that the registration completeness of an operator can also be reflected in terms of execution device. That is, when detecting whether the operator is completely registered in terms of the data type and the data layout, it is also checked whether the operator is completely registered in terms of the execution device. The accuracy of operator registration completeness is improved and the automatic detection of operator registration completeness is specific and standardized. In detail, as illustrated in FIG. 5, the method for operator registration processing based on deep learning may further include the following on the basis of FIG. 4.

At 501, one or more execution devices supported by the registered operator are obtained based on the description information.

It is to be understood that the description information defines inputs and outputs of an operator, as well as information supported by the operator, such as data type, data layout, and execution device. Therefore, the one or more execution devices supported by the registered operator can be obtained from the description information. An operating device in the description information is the execution device. It is to be understood that each operator in the deep learning framework supports performing calculations on different hardware devices, such as performing calculations on the CPU of the execution device, or performing calculations on the GPU of the execution device. Therefore, it is necessary to check whether the operator is completely registered in terms of the execution devices.

At 502, device configuration information corresponding to the operator type and preset in the deep learning framework is obtained.

That is, due to the different operator types, different device configuration information can be used to detect whether the one or more execution devices supported by the operator are complete. Therefore, for performing the registration completeness detection in terms of the one or more execution devices supported by the registered operator, the device configuration information corresponding to the operator type of the registered operator in the deep learning framework can be obtained. It can be detected whether the one or more execution devices supported by the registered operator are completely registered based on the device configuration information.

At 503, it is detected whether the one or more execution devices are completely registered based on the device configuration information.

In other words, whether the one or more execution devices supported by the registered operator are completely registered can be detected based on the device configuration information. For example, the execution devices supported by a general-typed operator may include the CPU and the GPU. If the one or more execution devices supported by the registered operator only include one of the CPU and the GPU, it can be determined that the registration of execution devices supported by the registered operator is incomplete. If the one or more execution devices supported by the registered operator includes both the CPU and the GPU, it can be determined that the registration of execution devices supported by the registered operator is complete.

At 504, if registration is complete, a third registration success prompt message of the registered operator is generated.

At 505, if the registration is incomplete, a missing execution device is obtained from the device configuration information, and a third registration failure prompt message is generated based on the missing execution device.

That is, when it is determined that the registration of execution devices supported by the registered operator is incomplete, the missing execution device of the registered operator can be obtained from the device configuration information. For example, the execution devices supported by a general-typed operator include the CPU and the GPU. If the one or more execution devices supported by a registered operator only include the CPU, it can be determined that the missing execution device of the registered operator is the GPU. The corresponding third registration failure prompt message is generated based on the missing execution device. The third registration failure prompt message is provided to the user such that the user can understand the reason why the operator is registered incompletely based on the registration failure prompt message.

With the method for operator registration processing based on deep learning according to embodiments of the disclosure, when detecting whether the operator is completely registered in terms of the data type and the data layout, it is also detected whether the operator is completely registered in terms of the execution device. Therefore, the accuracy of operator registration completeness can be further improved, and the automatic detection of operator registration completely is specific and standardized.

Figure 6:
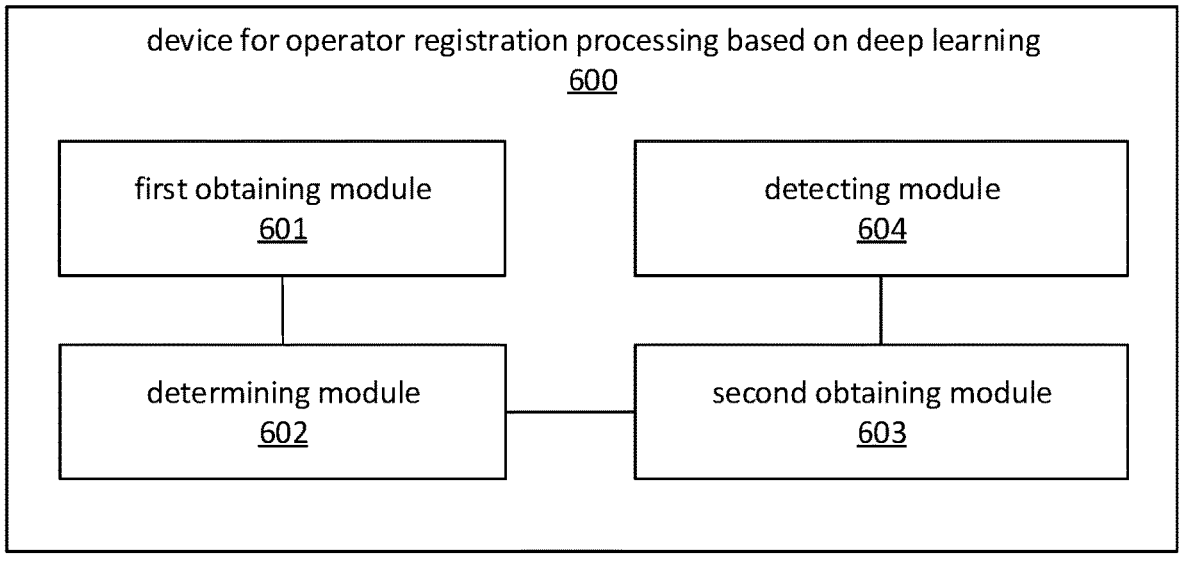
FIG. 6 is a block diagram illustrating a device for operator registration processing based on deep learning according to some embodiments of the disclosure.

FIG. 6 is a block diagram illustrating a device for operator registration processing based on deep learning according to some embodiments of the disclosure. As illustrated in FIG. 6, the device 600 for operator registration processing based on deep learning may include: a first obtaining module 601, a determining module 602, a second obtaining module 603, and a detecting module 604.

The first obtaining module 601 is used to obtain description information and logic operation information of a registered operator.

The determining module 602 is configured to determine an operator type of the registered operator based on the logic operation information.

In some examples, the determining module 602 is configured to obtain a target calculation logic corresponding to a preset target data type in the deep learning framework, perform a matching operation between the logic operation information and the target calculation logic; determine the registered operation is a first operator type based on the target calculation logic not containing the logic operation information; determine whether an operator operation is related to an input data based on the target calculation logic containing the logic operation information; determine the registered operator is the first operator type based on the operator operation being unrelated to the input data; and determine the register operation is a second operator type based on the operator operation being related to the input data.

The second obtaining module 603 is configured to obtain configuration information corresponding to the operator type and preset in a deep learning framework.

The detecting module 604 is configured to detect whether the registered operator is completely registered based on the description information and the configuration information.

In some examples, for obtaining the configuration information corresponding to the operator type and preset in the deep learning framework, the second obtaining module 603 is further configured to obtain data configuration information corresponding to the operator type and preset in the deep learning framework. For detecting whether the registered operator is completely registered based on the description information and the configuration information, the detecting module 604 is further configured to obtain one or more data types supported by the registered operator based on the description information, and detect whether the one or more data types are registered completely based on the data configuration information.

In some examples, for obtaining the one or more data types supported by the registered operator based on the description information, the detecting module 604 is further configured to obtain reference data type information, and obtain the one or more data types supported by the registered operator by parsing the description information based on the reference data type information through a regular matching algorithm.

Figure 7:
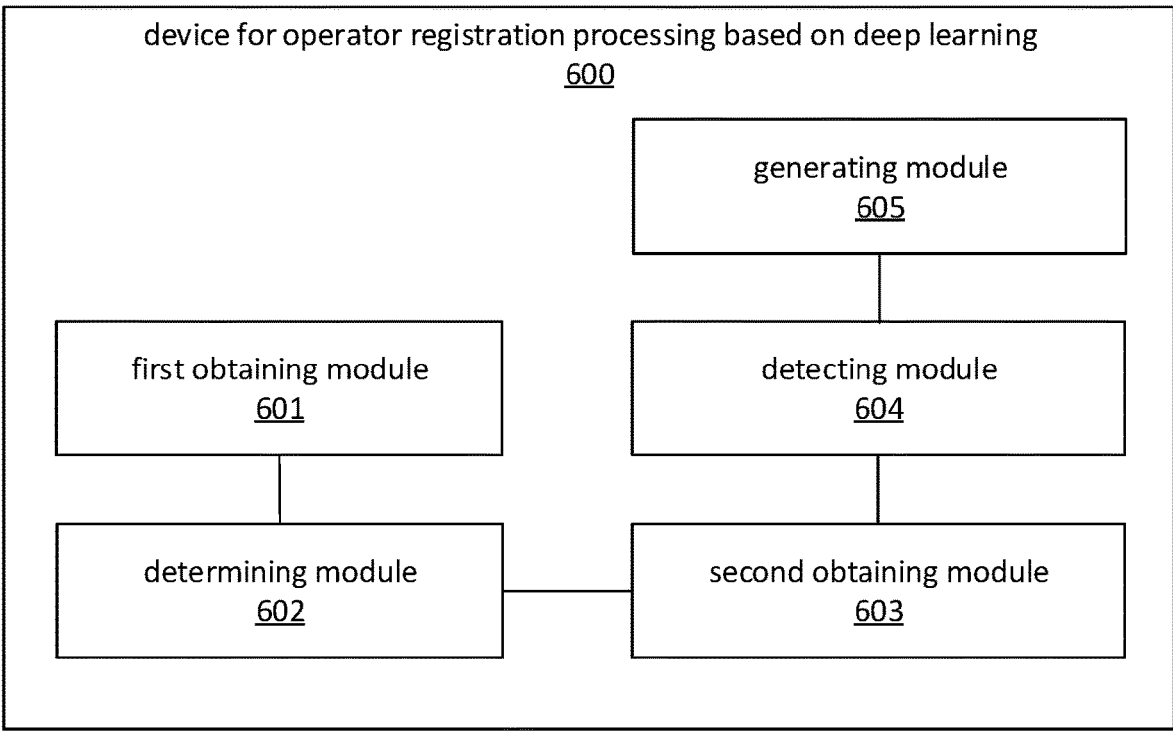
FIG. 7 is a block diagram illustrating a device for operator registration processing based on deep learning according to some embodiments of the disclosure.

In some examples, as illustrated in FIG. 7, the device 600 for operator registration processing based on deep learning may further include a generating module 605. The generating module 605 is configured to generate a first registration success prompt message of the registered operator when detecting that the one or more data types are registered completely; obtain a missing data type from the data configuration information when detecting that the one or more data types are registered incompletely, and generated a first registration failure prompt message based on the missing data type.

In some examples, the second obtaining module 603 is further configured to obtain layout configuration information corresponding to the operator type and preset in the deep learning framework. The detecting module 604 is further configured to obtain one or more data layouts supported by the registered operator based on the description information, and detect whether the one or more data layouts are registered completely based on the layout configuration information.

In some examples, the second obtaining module 603 is further configured to obtain device configuration information corresponding to the operator type and preset in the deep learning framework. The detecting module 604 is further configured to obtain one or more execution devices supported by the registered operator based on the description information, and detects whether the one or more execution devices are completely registered based on the device configuration information.

Regarding the above-mentioned device, operation manners of each module have been described in detail in method embodiments and will not be elaborated here.

With the device for operator registration processing based on deep learning according to embodiments of the disclosure, the description information and logic operation information of the registered operator are obtained, the operator type of the registered operator is determined based on the logic operation information, the one or more data types supported by the registered operator are obtained based on the description information, the data configuration information corresponding to the operator type and preset in the deep learning framework is obtained, and it is detected whether the one or more data types are completely registered based on the data configuration information. If the registration is complete, the first registration success prompt message of the registered operator is generated. If the registration is incomplete, the missing data type is obtained from the data configuration information, and the first registration failure prompt message is generated based on the missing data type. It can be seen that the disclosure provides a device for systematically detecting and monitoring the registration completeness of an operator in the deep learning framework. By extracting the description information and logic operation information of the registered operator, it can be automatically detected and monitored whether each new operator in the deep learning framework is registered completely in terms of the data type based on the description information and the logic operation information. Labor costs can be reduced and research and development efficiency is improved. In addition, the registration completeness of the registered operator is systematically detected in terms of the data type, thereby the support degree of each new operator in terms of the data type is ensured.

Embodiments of the disclosure further provide an electronic device and a readable storage medium.

Figure 8:
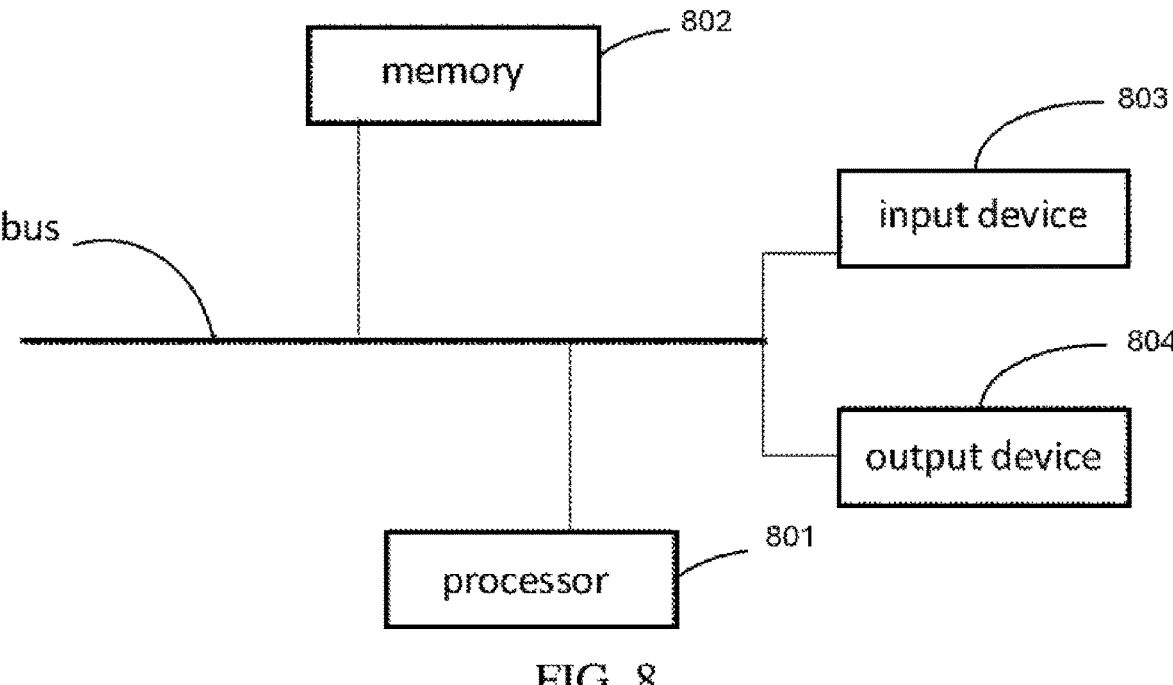
FIG. 8 is a block diagram illustrating an electronic device for implementing a method for operator registration processing based on deep learning according to some embodiments of the disclosure.

FIG. 8 is a block diagram illustrating an electronic device for implementing a method for operator registration processing based on deep learning according to embodiments of the disclosure. The electronic device is intended to represent various forms of digital computers, such as a laptop computer, a desktop computer, a workstation, a personal digital assistant, a server, a blade server, a mainframe computer, and other suitable computers. The electronic device may also represent various forms of mobile devices, such as a personal digital processing, a cellular phone, a smart phone, a wearable device, and other similar computing devices. The components, connections and relationships of the components, and functions of the components illustrated herein are merely examples, and are not intended to limit the implementation of the disclosure described and/or claimed herein.

As illustrated in FIG. 8, the electronic device includes: one or more processors 801, a memory 802, and interfaces for connecting various components, including a high-speed interface and a low-speed interface. Various components are connected to each other with different buses, and may be mounted on a common main board or mounted in other ways as required. The processor may process instructions executed within the electronic device, including instructions stored in or on the memory to display graphical information of the GUI (graphical user interface) on an external input/output device (such as a display device coupled to an interface). In other implementations, multiple processors and/or multiple buses may be used together with multiple memories if necessary. Similarly, multiple electronic devices may be connected, and each electronic device provides a part of necessary operations (for example, as a server array, a group of blade servers, or a multiprocessor system). In FIG. 8, one processor 801 is taken as an example.

The memory 802 is a non-transitory computer-readable storage medium according to embodiments of the disclosure. The memory is configured to store instructions executable by at least one processor, to cause the at least one processor to execute a method for operator registration processing based on deep learning according to embodiments of the disclosure. The non-transitory computer-readable storage medium according to embodiments of the disclosure is configured to store computer instructions. The computer instructions are configured to enable a computer to execute a method for operator registration processing based on deep learning according to embodiments of the disclosure.

As the non-transitory computer-readable storage medium, the memory 802 may be configured to store non-transitory software programs, non-transitory computer executable programs and modules, such as program instructions/modules (such as, a first obtaining module 601, a determining module 602, a second obtaining module 603 and a detecting module 604 of FIG. 6) corresponding to a method for operator registration processing based on deep learning according to embodiments of the disclosure. The processor 801 executes various functional applications and data processing of the server by operating non-transitory software programs, instructions and modules stored in the memory 802, that is, implements a method for operator registration processing based on deep learning according to embodiments of the disclosure.

The memory 802 may include a storage program region and a storage data region. The storage program region may store an application required by an operating system and at least one function. The storage data region may store data created by implementing the method for video frame interpolation through the electronic device. In addition, the memory 802 may include a high-speed random-access memory and may also include a non-transitory memory, such as at least one disk memory device, a flash memory device, or other non-transitory solid-state memory device. In some embodiments, the memory 802 may optionally include memories remotely located to the processor 801 which may be connected to the electronic device configured to implement a method for processing an image via a network. Examples of the above network include, but are not limited to, the Internet, an intranet, a local area network, a mobile communication network and combinations thereof.

The electronic device configured to implement a method for operator registration processing based on deep learning may also include: an input device 803 and an output device 804. The processor 801, the memory 802, the input device 803, and the output device 804 may be connected through a bus or in other means. In FIG. 8, the bus is taken as an example.

The input device 803 may be configured to receive inputted digitals or character information, and generate key signal input related to user setting and function control of the electronic device configured to implement a method for operator registration processing based on deep learning, such as a touch screen, a keypad, a mouse, a track pad, a touch pad, an indicator stick, one or more mouse buttons, a trackball, a joystick and other input device. The output device 804 may include a display device, an auxiliary lighting device (e.g., LED), a haptic feedback device (e.g., a vibration motor), and the like. The display device may include, but be not limited to, a liquid crystal display (LCD), a light emitting diode (LED) display, and a plasma display. In some embodiments, the display device may be a touch screen.

The various implementations of the system and technologies described herein may be implemented in a digital electronic circuit system, an integrated circuit system, an application specific ASIC (application specific integrated circuit), a computer hardware, a firmware, a software, and/or combinations thereof. These various implementations may include: being implemented in one or more computer programs. The one or more computer programs may be executed and/or interpreted on a programmable system including at least one programmable processor. The programmable processor may be a special purpose or general-purpose programmable processor, may receive data and instructions from a storage system, at least one input device and at least one output device, and may transmit the data and the instructions to the storage system, the at least one input device and the at least one output device.

These computing programs (also called programs, software, software applications, or codes) include machine instructions of programmable processors, and may be implemented by utilizing high-level procedures and/or object-oriented programming languages, and/or assembly/machine languages. As used herein, the terms "machine readable medium" and "computer readable medium" refer to any computer program product, device, and/or apparatus (such as, a magnetic disk, an optical disk, a memory, a programmable logic device (PLD)) for providing machine instructions and/or data to a programmable processor, including machine readable medium that receives machine instructions as machine readable signals. The term "machine readable signal" refers to any signal for providing the machine instructions and/or data to the programmable processor.

To provide interaction with a user, the system and technologies described herein may be implemented on a computer. The computer has a display device (such as, a CRT (cathode ray tube) or a LCD (liquid crystal display) monitor) for displaying information to the user, a keyboard and a pointing device (such as, a mouse or a trackball), through which the user may provide the input to the computer. Other types of devices may also be configured to provide interaction with the user. For example, the feedback provided to the user may be any form of sensory feedback (such as, visual feedback, auditory feedback, or tactile feedback), and the input from the user may be received in any form (including acoustic input, voice input or tactile input).

The system and technologies described herein may be implemented in a computing system including a background component (such as, a data server), a computing system including a middleware component (such as, an application server), or a computing system including a front-end component (such as, a user computer having a graphical user interface or a web browser through which the user may interact with embodiments of the system and technologies described herein), or a computing system including any combination of such background component, the middleware components, or the front-end component. Components of the system may be connected to each other through digital data communication in any form or medium (such as, a communication network). Examples of the communication network include a local area network (LAN), a wide area networks (WAN), and the Internet.

The computer system may include a client and a server. The client and the server are generally remote from each other and usually interact via the communication network. A relationship between the client and the server is generated by computer programs operated on a corresponding computer and having a client-server relationship with each other.

With the technical solution according to embodiments of the disclosure, the description information and logic operation information of the registered operator are obtained, the operator type of the registered operator is determined based on the logic operation information, the one or more data types supported by the registered operator are obtained based on the description information, the data configuration information corresponding to the operator type and preset in the deep learning framework is obtained, and it is detected whether the one or more data types are completely registered based on the data configuration information. If the registration is complete, the first registration success prompt message of the registered operator is generated. If the registration is incomplete, the missing data type is obtained from the data configuration information, and the first registration failure prompt message is generated based on the missing data type. It can be seen that the disclosure provides a method for systematically detecting and monitoring the registration completeness of an operator in the deep learning framework. By extracting the description information and logic operation information of the registered operator, it can be automatically detected and monitored whether each new operator in the deep learning framework is registered completely in terms of the data type based on the description information and the logic operation information. Labor costs can be reduced and research and development efficiency is improved. In addition, the registration completeness of the registered operator is systematically detected in terms of the data type, thereby the support degree of each new operator in terms of the data type is ensured.

It should be understood, steps may be reordered, added or deleted by utilizing flows in the various forms illustrated above. For example, the steps described in the disclosure may be executed in parallel, sequentially or in different orders, so long as desired results of the technical solution disclosed by the disclosure may be achieved without limitation herein.

The above detailed implementations do not limit the protection scope of the disclosure. It should be understood by the skilled in the art that various modifications, combinations, sub-combinations and substitutions may be made based on design requirements and other factors. Any modification, equivalent substitution and improvement made within the spirit and the principle of the disclosure shall be included in the protection scope of disclosure.

What is claimed is:

1. A method for operator registration processing in a deep learning framework, comprising:

obtaining description information and logic operation information of a registered operator in the deep learning framework used in performing a computer vision task, wherein the description information describes configuration information supported by the registered operator, and the registered operator is used to perform a calculation operation of an input tensor of the deep learning framework on a central processing unit (CPU) or a graphic processing unit (GPU);

determining an operator type of the registered operator based on the logic operation information;

obtaining configuration information corresponding to the operator type and preset in the deep learning framework, and detecting whether the configuration information supported by the registered operator is registered completely based on the description information and the configuration information;

wherein obtaining the configuration information corresponding to the operator type and preset in the deep learning framework comprises:

obtaining layout configuration information corresponding to the operator type and preset in the deep learning framework; and wherein detecting whether the registered operator is registered completely based on the description information and the configuration information comprises:

obtaining one or more data layouts supported by the registered operator based on the description information; and detecting whether the one or more data layouts are registered completely based on the layout configuration information; and wherein the input tensor is a four-dimensional tensor in a form of [NCHW] or [NHWC], wherein N is a number of pictures, C is a number of channels, H is height of pictures, and W is width of the pictures.

2. The method of claim 1, wherein determining the operator type of the registered operator based on the logic operation information comprises:

obtaining a target calculation logic corresponding to a target data type preset in the deep learning framework, and performing a matching operation between the logic operation information and the target calculation logic;

determining the registered operator is a first operator type based on the target calculation logic not containing the logic operation information;

determining whether an operator operation is related to an input data based on the logic operation information based on the target calculation logic containing the logic operation information, determining the registered operator is the first operator type based on the operator operation being unrelated to the input data, and determining the registered operator is a second operator type based on the operator operation being related to the input data.

3. The method of claim 1, wherein obtaining the configuration information corresponding to the operator type and preset in the deep learning framework further comprises:

obtaining data configuration information corresponding to the operator type and preset in the deep learning framework; and wherein detecting whether the configuration information supported by the registered operator is registered completely based on the description information and the configuration information further comprises:

obtaining one or more data types supported by the registered operator based on the description information; and detecting whether the one or more data types are registered completely based on the data configuration information.

4. The method of claim 3, wherein obtaining the one or more data types supported by the registered operator based on the description information comprises:

obtaining reference data type information; and obtaining the one or more data types supported by the registered operator by parsing the description information based on the reference data type information through a regular matching algorithm.

5. The method of claim 3, wherein, obtaining the configuration information corresponding to the operator type and preset in the deep learning framework further comprises:

obtaining device configuration information corresponding to the operator type and preset in the deep learning framework; and wherein detecting whether the configuration information supported by the registered operator is registered completely based on the description information and the configuration information further comprises:

obtaining one or more execution devices supports by the registered operator based on the description information; and detecting whether the one or more execution devices are registered completely based on the configuration information.

6. An electronic device, comprising:

at least one processor; and a memory, communicatively coupled with the at least one processor;

wherein the memory is configured to store instructions executable by the at least one processor, the instructions are executed by the at least one processor to cause the at least one processor to:

obtain description information and logic operation information of a registered operator in a deep learning framework used in performing a computer vision task, wherein the description information describes configuration information supported by the registered operator, and the registered operator is used to perform a calculation operation of an input tensor of the deep learning framework on a central processing unit (CPU) or a graphic processing unit (GPU);

obtain an operator type of the registered operator based on the logic operation information; and obtain configuration information corresponding to the operator type and preset in the deep learning framework, and detect whether the configuration information supported by the registered operator is registered completely based on the description information and the configuration information, wherein the at least one processor is further configured to:

obtain layout configuration information corresponding to the operator type and preset in the deep learning framework; and obtain one or more data layouts supported by the registered operator based on the description information; and detect whether the one or more data layouts are registered completely based on the layout configuration information;

wherein the input tensor is a four-dimensional tensor in a form of [NCHW] or [NHWC], wherein N is a number of pictures, C is a number of channels, H is height of pictures, and W is width of the pictures.

7. The electronic device of claim 6, wherein the at least one processor is further configured to:

obtain a target calculation logic corresponding to a target data type preset in the deep learning framework, and perform a matching operation between the logic operation information and the target calculation logic;

determine the registered operator is a first operator type based on the target calculation logic not containing the logic operation information;

determine whether an operator operation is related to an input data based on the logic operation information based on the target calculation logic containing the logic operation information, determine the registered operator is the first operator type based on the operator operation being unrelated to the input data, and determine the registered operator is a second operator type based on the operator operation being related to the input data.

8. The electronic device of claim 6, wherein the at least one processor is further configured to:

obtain data configuration information corresponding to the operator type and preset in the deep learning framework; and obtain one or more data types supported by the registered operator based on the description information; and detect whether the one or more data types are registered completely based on the data configuration information.

9. The electronic device of claim 8, wherein the at least one processor is further configured to:

obtain reference data type information; and obtain the one or more data types supported by the registered operator by parsing the description information based on the reference data type information through a regular matching algorithm.

10. The electronic device of claim 8, wherein the at least one processor is further configured to:

obtain device configuration information corresponding to the operator type and preset in the deep learning framework; and obtain one or more execution devices supports by the registered operator based on the description information; and detect whether the one or more execution devices are registered completely based on the configuration information.

11. A non-transitory computer-readable storage medium, having computer instructions stored thereon, wherein the computer instructions are configured to cause a computer to execute a method for operator registration processing based on deep learning, the method comprising:

obtaining description information and logic operation information of a registered operator in a deep learning framework used in performing a computer vision task, wherein the description information describes configuration information supported by the registered operator, and the registered operator is used to perform a calculation operation of an input tensor of the deep learning framework on a central processing unit (CPU) or a graphic processing unit (GPU);

obtaining an operator type of the registered operator based on the logic operation information; and obtaining configuration information corresponding to the operator type and preset in the deep learning framework, and detecting whether the configuration information supported by the registered operator is registered completely based on the description information and the configuration information;

wherein, obtaining the configuration information corresponding to the operator type and preset in the deep learning framework comprises:

obtaining layout configuration information corresponding to the operator type and preset in the deep learning framework; and wherein detecting whether the registered operator is registered completely based on the description information and the configuration information comprises:

obtaining one or more data layouts supported by the registered operator based on the description information; and detecting whether the one or more data layouts are registered completely based on the layout configuration information; and wherein the input tensor is a four-dimensional tensor in a form of [NCHW] or [NHWC], wherein N is a number of pictures, C is a number of channels, H is height of pictures, and W is width of the pictures.

12. The non-transitory computer-readable storage medium of claim 11, wherein determining the operator type of the registered operator based on the logic operation information comprises:

obtaining a target calculation logic corresponding to a target data type preset in the deep learning framework, and performing a matching operation between the logic operation information and the target calculation logic;

determining the registered operator is a first operator type based on the target calculation logic not containing the logic operation information;

determining whether an operator operation is related to an input data based on the logic operation information based on the target calculation logic containing the logic operation information, determining the registered operator is the first operator type based on the operator operation being unrelated to the input data, and determining the registered operator is a second operator type based on the operator operation being related to the input data.

13. The non-transitory computer-readable storage medium of claim 11, wherein, obtaining the configuration information corresponding to the operator type and preset in the deep learning framework further comprises:

obtaining data configuration information corresponding to the operator type and preset in the deep learning framework; and wherein detecting whether the configuration information supported by the registered operator is registered completely based on the description information and the configuration information further comprises:

obtaining one or more data types supported by the registered operator based on the description information; and detecting whether the one or more data types are registered completely based on the data configuration information.

14. The non-transitory computer-readable storage medium of claim 13, wherein, obtaining the configuration information corresponding to the operator type and preset in the deep learning framework further comprises:

obtaining device configuration information corresponding to the operator type and preset in the deep learning framework; and wherein detecting whether the configuration information supported by the registered operator is registered completely based on the description information and the configuration information further comprises:

obtaining one or more execution devices supports by the registered operator based on the description information; and detecting whether the one or more execution devices are registered completely based on the configuration information.

15. The method of claim 3, further comprising:

generating a first registration success prompt message based on detecting that the one or more data types are registered completely; or obtaining a missing data type from the data configuration information and generating a first registration failure success prompt message based on the missing data type based on detecting that the one or more data types are registered incompletely.

16. The electronic device of claim 8, wherein the at least one processor is further configured to:

generate a first registration success prompt message based on detecting that the one or more data types are registered completely; or obtain a missing data type from the data configuration information and generate a first registration failure success prompt message based on the missing data type based on detecting that the one or more data types are registered incompletely.

17. The non-transitory computer-readable storage medium of claim 13, wherein the method further comprises:

generating a first registration success prompt message based on detecting that the one or more data types are registered completely; or obtaining a missing data type from the data configuration information and generating a first registration failure success prompt message based on the missing data type based on detecting that the one or more data types are registered incompletely.

* * * * *